United States Patent Office 3,172,424
Patented Mar. 9, 1965

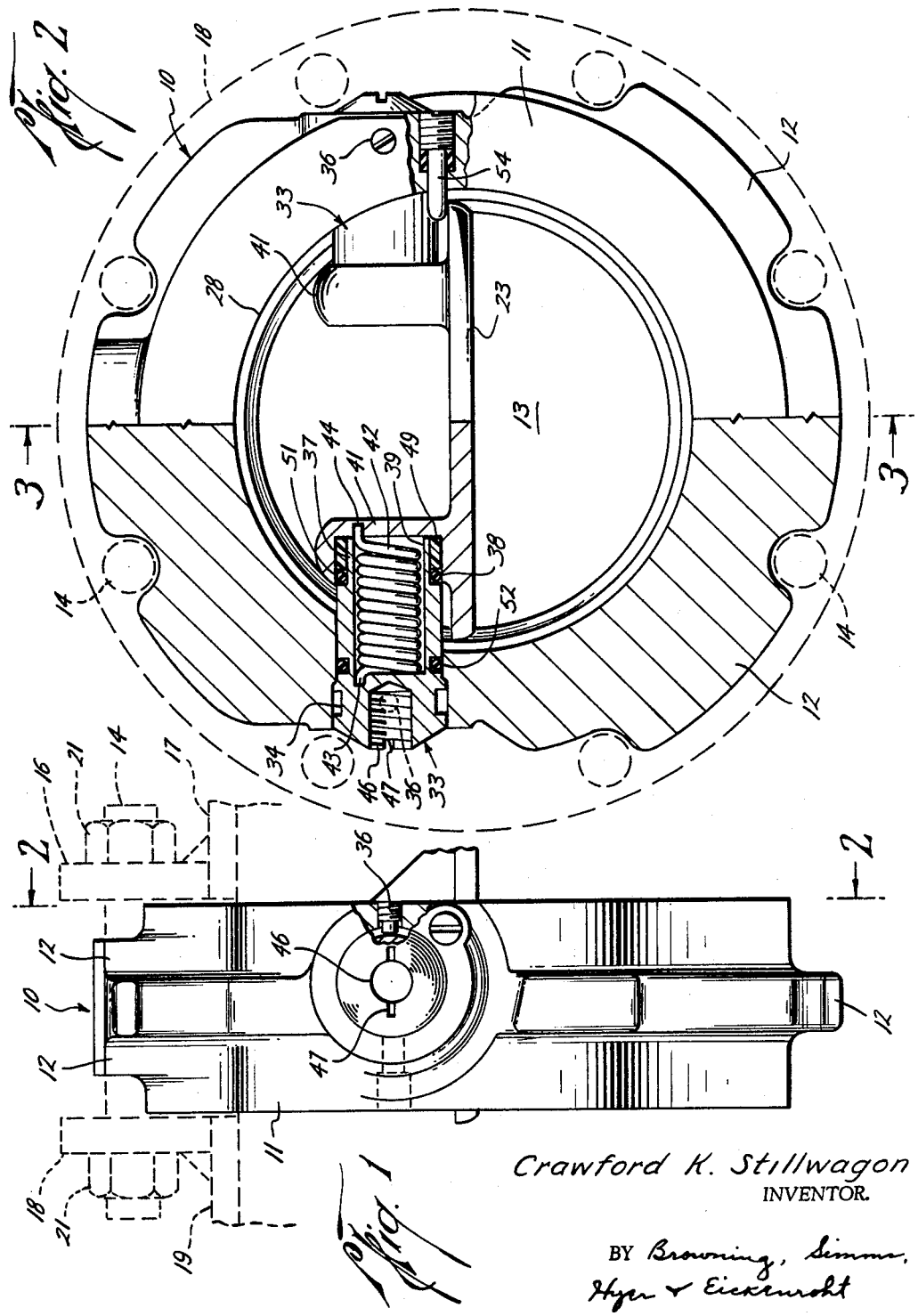

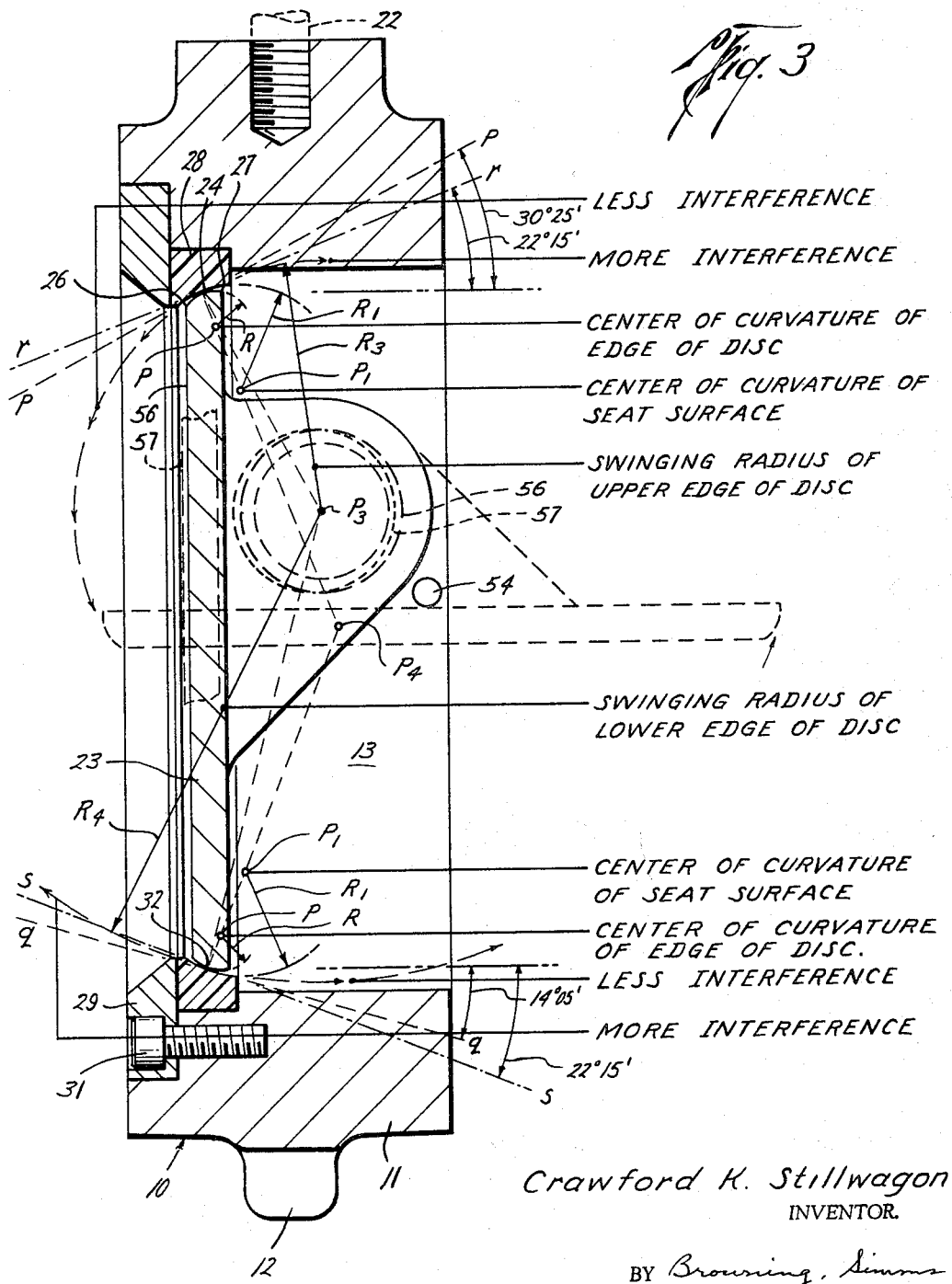

3,172,424
DISC TYPE CHECK VALVE
Crawford K. Stillwagon, 5325 Kirby Drive,
Houston 5, Tex.
Filed July 24, 1962, Ser. No. 211,979
2 Claims. (Cl. 137—527.4)

This invention relates to disc type check valves and more particularly to an improved mounting and seating of the disc member in such valves. The term "disc type" is used to designate a valve in which the closure is a disc mounted to turn between open and closed positions about an axis closer to the disc axis than the outer edge of the disc, as distinguished from a flapper type valve in which the closure is mounted to swing on an axis outwardly of the outer edge of the closure.

In valves of this character it is desirable that under conditions of no flow the valve closure element moves to its closed position so that when tendency to reverse flow occurs, the closure element will not be caused to move very rapidly to closed position and seat with a hammering effect. When the valve is to be mounted in such a position that the force of gravity will constantly urge the closure element toward closed position no great problem is encountered as gravity may be employed to provide the bias needed so that the valve will close just as flow stops in the direction that flow is permitted by the valve, and will be already firmly seated before tendency to reverse flow occurs. In order to provide this bias when the valve is mounted in other positions, spring biasing means may be provided exerting a constant tension on the valve tending to close it with the same effect as secured through the force of gravity as just described. However, in order that a spring biased valve might be adaptable for different mounting positions it is desirable that such springs be made adjustable from outside of the valve. The springs themselves, however, should be enclosed to protect them from weather and exterior influences and for this reason such springs in the past have been mounted inside the valve. Furthermore, unless the shaft on which the valve closure member turns is to project through stuffing boxes or the like, capable of holding the entire differential of pressure between the interior and exterior of the valve and usually substantially hindering the swinging movement of the valve, it has been considered necessary to mount such springs within the valve. Such mounting within the valve is objectionable however, in cases such as in the handling of food or explosive material under which conditions the lodgment of the material being handled within the spring and its associated parts could not be tolerated.

One object of this invention is to provide a disc type check valve with a spring bias in which the spring means providing the bias is located within the valve housing and remote from the exterior thereof, yet is protected adequately against contact with or lodgment therein of materials being handled.

Another object is to provide a valve of the character last mentioned in which the spring biasing means may be adjusted from the exterior of the valve.

The specific embodiment illustrated also employs springs to urge the disc member continuously to closed position and has seals between the springs and the flowway through the valve to prevent any leakage of lubricant or the like into the passageway for sanitary applications such as food handling and the like. Also, the seals prevent any leakage of the fluid from the passageway to the springs which might cause improper functioning of the springs.

Apparatus embodying features of my invention is shown in the accompanying drawings forming a part of this application, in which:

FIG. 1 is a side elevational view of a disc type check valve embodying the present invention with the valve body adapted to be disposed between flanges of inlet and outlet conduits as shown in dotted lines;

FIG. 2 is an end elevational view looking generally along line 2—2 of FIG. 1 with the left-hand portion broken away and shown in section along a plane through the axis of the disc closure mounting and showing a torsion spring for urging the disc member to closed position; and, FIG. 3 is a sectional view taken generally along line 3—3 of FIG. 2, but with the valve closed, and showing the sealing surfaces of the valve seat and disc member with the disc member in closed position, the radii of the sealing surfaces and the swinging radius of the disc member being indicated thereon.

In the drawings, there is shown a disc type check valve embodying the present invention indicated generally at 10. The valve 10 comprises a valve body 11 having a horizontally extending fluid passageway 13 therethrough. Lugs 12 are provided about the outer circumference of the valve body 11 and connecting bolts 14 fit between lugs 12 to secure valve body 11 between flange 16 of an outlet conduit 17 and flange 18 of an inlet conduit 19. Nuts 21 secure connecting bolts 14 in position as indicated in dotted lines in FIG. 1. As shown in FIG. 3, an eye bolt 22 may be threadedly connected to the body for easy handling of the valve.

The valve closure comprises a generally flat disc member 23 having an outer circumference 24 which, in a plane through the disc axis and extending radially therefrom, has a uniform arcuate convex curvature. This curvature is on an arc struck from point P on a radius indicated by arrow R. Circumference 24 thus provides a convex seating surface on the disc, and this surface has an inlet edge 26 and an outlet edge 27 thereon.

An annular valve seat element 28 is carried in the body to receive and seat the seating surface on the disc. This seat element is retained in position by a retaining ring 29 secured to valve body 11 by screws 31. Valve seat 28 has an inwardly facing preferably concave seating surface 32 thereon cooperating with convex surface 24 of disc member 23 to seal disc member 23. Concave surface 32 is struck from point $P_1$ on a radius $R_1$. Radius $R_1$ is greater than the radius R from which convex surface 24 is struck and thus the two are tangent and the edges 26 and 27 of convex surface 24 are spaced from concave surface 32 when disc member 23 is in closed position as shown in FIG. 3. It should be noted that disc member 23 engages valve seat 28 intermediately of edges 26 and 27 on a substantially line contact. The contact area is thus small and the unit sealing pressure thereon for any given set of conditions will be greater than for two surfaces such as conical surfaces seating together.

Valve seat 28 is formed of a resilient material. A material which I have found to work effectively is polymerized tetrafluoroethylene sold under the trademark "Teflon" of E. I. du Pont de Nemours & Co., Wilmington, Delaware, and described in United States Patent No. 2,456,262, issued December 14, 1948, on the application of Reuben T. Fields.

Support means for disc member 23 comprises a pair of stubs shafts 33 being in horizontal axis alignment and mounted on opposite sides of valve body 11. Each shaft 33 has a circumferential groove 34 thereon and a set screw 36 fits within circumferential groove 34 to hold shaft 33 in position longitudinally and lock it against rotation. Shafts 33 extend inwardly of passageway 12 and each shaft 33 has a reduced diameter inner end 37 forming an inwardly facing shoulder 38. An inwardly facing cavity 39 is provided centrally of the inner end of each shaft 33. Collars 41 each having a closed end are carried on disc member 23 and fit about the reduced diameter ends 37. A torsion spring 42 is mounted within each cavity 39 and has one end 43 secured to the shaft 33 and the other end 44 secured to collar 41. Torsion springs 42 urge disc member 23 to closed position and may be adjusted to close valve disc 23 at a predetermined fluid line pressure.

For adjusting the loading of torsion springs 42, a slot 47 is provided on each shaft 33. The outer end of each shaft 33 is tapped at 46 to receive an eye or other means for inserting and removing the shaft. Upon the loosening of set screw 36, shaft 33 may be turned by a screw driver inserted in slot 47. The rotational movement of shaft 33 moves end 43 of torsion spring 42 relative to end 44 and thus, a predetermined loading may be placed on torsion spring 42. Upon the movement of shaft 33 to a desired position, set screw 36 may again be tightened.

A resilient bearing sleeve 49 is disposed about the reduced diameter end 37 between collar 41 and shaft 33. Resilient sleeve 49 may be formed of a synthetic plastic material such as polymerized tetrafluroethylene from which the resilient valve seat 28 is preferably formed. An O-ring 52 is disposed outwardly of passageway 13 about shaft 33 to seal between the shaft 33 and the body. It is noted that, except for the occasional adjustment of the shaft, this seal is between parts not movable relative to each other and provides a stationary seal for retaining the pressure differential between the interior and exterior of the valve. An O-ring 51 is positioned between abutment 38 and sleeve 49 to seal spring 42 and sleeve 49 from passageway 13. It is necessary to have such a seal as 51 when a sanitary application is made of the present invention such as in food handling or in an application involving handling of explosives and the like, to prevent the same from contaminating or lodging in the spring 42 and cavity 39. Such seal is a rotary seal but need not withstand much pressure differential as the main pressure differential will be taken by the stationary seal 52.

Referring to FIG. 3, the swinging radius for the uppermost portion of disc member 23 is indicated by line $R_3$ struck from the axis of the disc support shafts 33, designated $P_3$. $R_3$ is shorter than the radius of the disc. The swinging radius for the lowermost portion of disc member 23 is indicated by radius $R_4$ swung from point $P_3$, which is longer than $R_3$ and longer than the disc radius. This is because the shafts 33 are disposed in axial alignment at a position offset from and transverse to the center line of the flow passage 13 and offset from the center of disc member 23 by the same amount. Thus, the lower circumference of disc member 23 moves a greater distance than the upper circumference when the disc member moves between open and closed position.

To limit the swinging of disc member 23 in open position as shown in FIG. 2, a stop 54 is secured to valve body 11. When disc member 23 engages stop 54, the horizontal center line of disc member 23 is in axial alignment with the longitudinal center line of passageway 13 thereby providing a minimum restriction to line flow.

Referring to FIG. 3, the normal position of disc member or gate 23, when it has sufficient interference with the seat to stop its swinging but without back pressure, is shown by dotted lines indicated by numeral 56. When disc member 23 is in closed position and an increase in back pressure occurs, it is desirable that disc member 23 will move or float under the influence of such pressure on the disc, against resilient valve seat 28 to the position indicated by dotted lines 57 in FIG. 3. This causes an increase in the sealing pressure to contain the increase in pressure sealed against, without further swinging of the disc. This floating movement under pressure is permitted since resilient bushings 49 are positioned between collars 41 and shafts 33 and may be distorted to permit the collars 49 to move to eccentricity with respect to shaft 33. The sealing pressure or interference increases when disc member 23 and collars 41 thereon move toward valve seat 28 and a full seating or sealing of disc member 23 is effected thereby proportional to the pressure sealed against. Then the back pressure decreases, disc member 23 returns to its initial closed position 56 and the interference at valve seat 28 decreases which allows disc member 23 to open easily and without any sticking tendency upon fluid pressure being exerted from the inlet side of valve body 11.

The thickness and location of the center of rotation of the disc 23 are determined by the pressure differentials expected to be encountered in the operation of the valve and by other factors which need not be discussed here because they are based upon known engineering principles. As hereinbefore explained, it is desirable, in order to prevent the lodgment of solids between the seating surfaces, such as might prevent sealing thereof, that the seating surfaces be so shaped as to seat along a line, as distinguished from a broad surface such as would be involved in the seating of two conical surfaces against each other or two curved surfaces of the same radius against each other. In order to accomplish this objective one of the surfaces needs to be curved and the other of a shape other than the same curve as the first surface and located to seat tangentially against the first surface.

When the disc 23 is in closed position as shown in FIG. 3, it is necessary that it have a sealing interference about its entire outer edge with the seating surface of the seat 28. The axis $P_3$ having been determined, the greatest distance from this axis to the interior of the passageway through the valve in a plane at right angles to the axis of such passageway will determine the maximum possible distance from the axis $P_3$ to the edge of the disc and to provide the necessary clearance a disc diameter which will involve a slightly smaller distance should be selected. Laying out the thus indicated maximum diameter of the disc and considering the location of the valve seat 28 with respect to the axis $P_3$ as determined by engineering design, the desired points of seating of the edge of the disc against the seat 28 may be located. The thickness of the disc having been determined by the required stress to which it is to be subjected, the disc should be laid out with the line of engagement or seating thereof with the seat member 28 lying substantially midway between the front and rear surfaces of the disc.

Lines should now be drawn to the axis $P_3$ from the uppermost point of engagement and the lowermost point of engagement respectively, as indicated in FIG. 3. An arc with the point $P_3$ as a center and with a radius $R_3$ through the upper point of contact will describe the path of the upper edge of the disc as it moves between open and closed positions and when it moves to the right as seen in FIG. 3 it should move toward greater interference with the seat 28 and to the left toward a position of less interference. Conversely, an arc with a radius $R_4$ through the lower point of contact will describe the path of movement of the lower edge of the disc between open and closed positions with movement to the right being toward a condition of less interference with the seat 28 and movement to the left toward a condition of more interference.

In order to achieve an optimum design one should first construct a line of tangency to each of the two arcs mentioned, such lines being designated $p—p$ and $q—q$ in FIG. 3. If the seating surface of the seat 28 coincided with such line, then there would be contact between the seating surfaces at the desired points but interference would decrease in both directions from such line. It being desirable that interference increase against the entire seating surface of the seat 28 as the disc rotates about $P_3$ in a clockwise direction in FIG. 3, the effective seating surface of the seat 28 at the point of full engagement should be on a lesser angle to the axis of the seat 28 than that of the tangent p—p and at a greater angle to such axis than that of the tangent q—q. Preferably the angle of the seating surface in the seat 28 should be midway between that of the lines p—p and q—q. Thus, it for a given situation the angle between the line p—p and the axis of the seat 28 is 30° 25′ and that of the line q—q with the axis 14° 05′, the optimum angle for the seating surface at the point of contact with the disc would be 22° 15′. Such angle is shown by the lines r—r and s—s in FIG. 3.

There should now be constructed lines perpendicular to r—r and s—s through the desired point of tangency or contact between the seating surfaces, which lines would intersect on the axis of the passageway through the valve at $P_4$.

In order that the seating surfaces on the disc and valve seat engage tangentially at the points indicated, any curvatures of these surfaces in planes coincidental with the passageway axis should be on centers lying on the lines between the point $P_4$ and the points of tangential engagement. Preferably the center for the curvature on the edge of the disc should be at a point P between the front and rear faces of the disc and the radius R should be not less than one-half the thickness of the disc.

While a conical surface in the seat member 28 coincidental with the angle provided by the lines r—r and s—s or even possibly a convex surface would provide a tangential engagement with such a curved surface on the disc, and would provide increasing and decreasing interference in the desired directions, if the seating surface on the seat member 28 be made concave as shown, it will be observed that the rate of increase in interference between the surfaces and the ultimate interference offered as the disc moves toward closed position will be greater than with a conical or convex surface in the seat 28. Therefore, it is preferred that this seating surface in the seat member 28 be formed with a concave curvature about a center $P_1$ on a radius $R_1$ greater than the radius R.

The arrangement and relation of surfaces just indicated will both provide the desired line contact between surfaces and will tend to minimize the amount of swinging movement of the disc and the tendency of the disc to stick due to such swinging movement after initial seating contact when the disc moves to closed position. The additional interference desirable under higher pressure conditions will be provided without such danger of sticking by the resilient bushings 49 heretofore described.

In operation, with the flow of fluid from inlet conduit 19, disc member 23 swings to open position in engagement with stop 54 as indicated in FIG. 2 and against the bias of torsion springs 42 which have been adjusted, depending on the position of the valve, to close disc member 23 at a predetermined minimum fluid flow pressure from the inlet before a reversal of flow occurs. When the predetermined fluid pressure is reached, torsion springs 42 urge disc member 23 to closed position. In the event solid particles are caught on valve seat 28, disc member 23 which engages concave surface 32 in a substantially line contact area pushes or divides the solid particles on such seating surface and disc member 23 seats fully on concave surface 32 with a maximum of unit seating pressure. Since disc member 23 closes before the reversal of flow actually occurs, hammering action is minimized. After a reversal of flow pressure and an increase in back pressure, disc member 23 and collars 41 thereon move toward resilient seat 28 with the movement being relative to stub shafts 33 and being permitted by distortion of resilient bushings 49. Upon a decrease in back pressure, disc member 23 and collars 41 return to their initial closed position with less sealing interference, due to the action of the resilient bushings 49 and seat 28, in which position disc member 23 remains until a predetermined flow pressure again opens disc member 23 against the bias of torsion springs 42.

From the foregoing, it will be understood that I have provided a disc type check valve in which the outer circumference of the disc member and the inner surface of the valve seat have cooperating surfaces engaging each other. Means are provided to urge continuously the disc member to closed position and comprises torsion springs which may be preloaded for actuation at a predetermined fluid line pressure. Seals are provided adjacent the torsion springs to prevent any leakage of fluids or other matter into or from the passageway.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a disc type check valve having a valve body with a fluid passageway therethrough and upstream and downstream ends, an annular valve seat within the body surrounding said passageway and having a seating surface thereon facing inwardly and downstream relative to said passageway, a disc member pivotally mounted in the body on an axis intersecting said passageway transverse to and offset laterally from the center of said passageway and disc member and having a seating surface thereon facing outwardly and upstream to engage the seating surface on the annular valve seat when the disc member is transverse to said passageway on approximately the same angle as said annular valve seat, the improvement which comprises the pivotal mounting of said disc member including a shaft part carried by said body and fixed thereto in operation of the valve and extending into the interior thereof, so as to be exposed to the pressure in said passageway, a rotatable part carried by said disc member and rotatably engaging said shaft part, said parts being shaped to provide an enclosed chamber between them when so engaged, spring means in said chamber interengaged with said parts and biasing said disc member toward seated position, a rotary seal between said parts isolating said chamber from said passageway, said shaft part being rotatably adjustable relative to said body to permit adjustment of said spring means and having a portion exposed to the exterior of said body whereby such adjustment may be made from the exterior of said body, means exposed to the exterior of said body for securing said shaft part in any desired position of adjustment relative to said body, and a stationary seal between said shaft part and body for sealing against the operating pressure differential between the interior and exterior of said body.

2. In a disc type check valve having a valve body with a fluid passageway therethrough and upstream and downstream ends, an annular valve seat within the body surrounding said passageway and having a seating surface thereon facing inwardly and downstream relative to said passageway, a disc member pivotally mounted in the body on an axis intersecting said passageway transverse to and offset laterally from the center of said passageway and disc member and having a seating surface thereon facing outwardly and upstream to engage the seating surface on the annular valve seat when the disc member is transverse to said passageway on approximately the same angle as said annular valve seat, the improvement which comprises the pivotal mounting of said disc member including a shaft part carried by said body and fixed thereto in operation of the valve and extending into the interior thereof, so as to be exposed to the pressure in said passageway, a rotatable part carried by said disc member and rotatably engaging said shaft part, said parts being shaped to provide an enclosed chamber between them when so engaged, spring means in said chamber interengaged with said parts and biasing said disc member toward seated position, said shaft part being rotatably adjustable relative to said body to permit adjustment of said spring means and having a portion exposed to the exterior of said body whereby such adjustment may be made from the exterior of said body, means exposed to the exterior of said body for securing said shaft part in any desired position of adjustment relative to said body, and a stationary seal between said shaft part and body for sealing against the operating pressure differential between the interior and exterior of said body.

References Cited in the file of this patent

UNITED STATES PATENTS

| | | |
|---|---|---|
| 1,744,798 | Price | Jan. 28, 1930 |
| 2,556,904 | Cline | June 12, 1951 |
| 2,864,401 | Carr | Dec. 16, 1958 |
| 2,888,950 | Wheatley | June 2, 1959 |
| 2,995,936 | Heinzmann | Aug. 15, 1961 |
| 2,998,957 | Vulliez | Sept. 5, 1961 |
| 3,016,914 | Keithahn | Jan. 16, 1962 |
| 3,038,714 | Klavs | June 12, 1962 |
| 3,066,693 | Taylor | Dec. 4, 1962 |
| 3,074,427 | Wheeler | Jan. 22, 1963 |

FOREIGN PATENTS

| | | |
|---|---|---|
| 834,816 | France | Sept. 5, 1938 |